3,413,287
(OPTIONALLY 17 - ALKYLATED) 7α - METHYLAN-
DROSTONE-3β,17β-DIOLS, Δ⁴ AND 19-NOR DE-
RIVATIVES CORRESPONDING AND ETHERS
AND ESTERS THEREOF
Raymond E. Counsell, Ann Arbor, Mich., and Paul D.
Klimstra, Northbrook, Ill., assignors to G. D. Searle
& Co., Chicago, Ill., a corporation of Delaware
No Drawing. Filed May 2, 1966, Ser. No. 546,492
2 Claims. (Cl. 260—239.55)

ABSTRACT OF THE DISCLOSURE 3,17-bisoxygenated 7α-methyl steroids, optionally alkylated at the 17-position and useful in view of their hormonal and anti-hormonal properties, e.g. anabolic, androgenic, estrogenic and anti-estrogenic.

---

The present invention is concerned with 3,17-bisoxygenated steroids characterized by a 7α-methyl substituent and especially with the (optionally 17-alkylated) 7α-methylandrostane-3β,17β-diols, Δ⁴ and 19-nor derivatives corresponding and the ethers and esters thereof which are represented by the following structural formula

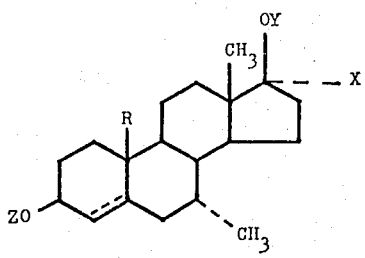

wherein R is hydrogen or a methyl radical, X is hydrogen or a lower alkyl radical, Y can be hydrogen, a lower alkanoyl or tetrahydropyran-2-yl group, Z is hydrogen, a lower alkanoyl or p-toluenesulfonyl radical and the dotted line represents an optionally doubly bonded linkage between carbon atoms 4 and 5.

The lower alkyl radicals encompassed by the Y and Z terms are exemplified by methyl, ethyl, propyl, butyl, pentyl, hexyl, heptyl and the branched-chain isomers thereof.

Illustrative of the lower alkanoyl radicals denoted by the symbols Y and Z in that structural representation are formyl, acetyl, propionyl, butyryl, valeryl, caproyl, heptanoyl and the branched-chain groups isomeric therewith.

The compounds of the present invention exhibit valuable pharmacological properties. They are hormonal and anti-hormonal agents, for example, as is evidenced by their anabolic, androgenic, estrogenic and anti-estrogenic activity.

Manufacture of the instant compounds is conveniently accomplished by methods which utilize starting materials represented by the following structural formula

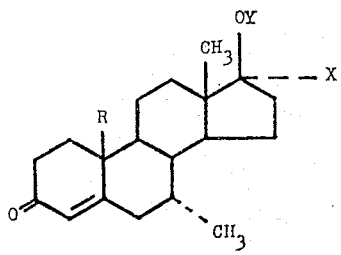

wherein R, X and Y are as hereinbefore defined. Reaction of those substances with a metallic chemical reducing agent such as lithium aluminum hydride, sodium borohydride, lithium tri-(tertiary-butoxy) aluminum hydride, diisobutyl aluminum hydride, etc., results in selective reduction of the 3-keto group to afford the corresponding 3β-hydroxy-Δ⁴ derivatives. A specific example of that process is the reaction of 17β-hydroxy-7α-methylestr-4-en-3-one in tetrahydrofuran with lithium tri-(tertiary-butoxy) aluminum hydride to produce 7α-methylestr-4-ene-3β,17β-diol.

The 3-hydroxy saturated A-ring compounds of this invention are alternatively produced by one of three methods. Catalytic hydrogenation of the aforementioned 3-hydroxy-Δ⁴ derivatives, utilizing a suitable catalyst such as platinum, palladium, ruthenium, strontium or zirconium is one preferred process. Typically, 7α-methylandrost-4-ene-3β,17β-diol in ethanol is shaken with hydrogen at atmospheric pressure and room temperature in the presence of platinum oxide catalyst to yield 7α-methyl-5α-androstane-3β,17β-diol. The second process involves concomitant reduction of the 3-keto and Δ⁴ functions by means of an alkali metal-liquid ammonia combination. Suitable alkali metals are sodium, potassium and lithium. By that procedure, utilizing lithium and liquid ammonia, 17β-hydroxy-7α-methylestr-4-en-3-one, for example, is converted to 17β-hydroxy-7α-methyl-5α-estran-3β-ol. The third process involves selective reduction of the Δ⁴ unsaturated linkage of the Δ⁴ 3-keto starting materials by means of catalytic hydrogenation with a suitable catalyst followed by reduction of the 3-keto group, utilizing a chemical reducing agent of the type described above. Palladium catalysts are particularly preferred for selective reduction of the Δ⁴ double bond. A specific example of the latter process is the hydrogenation, at atmospheric pressure and room temperature with a palladium catalyst, of 17β-hydroxy-7α,17α-dimethylandrost-4-en-3-one to afford 17β-hydroxy-7α,17α-dimethyl-5α-androstan-3-one, which is contacted with lithium tri-(tertiary-butoxy) aluminum hydride in tetrahydrofuran to produce 7α,17α-dimethyl-5α-androstane-3β,-17β-diol.

The 17-tetrahydropyran-2-yl ethers of this invention are conveniently produced by reaction of a 3-keto-Δ⁴ starting material with dihydropyran in the presence of an acid catalyst followed by reduction of the 3-keto and Δ⁴ functions. 17β-hydroxy-7α-methylestr-4-en-3-one is thus contacted with dihydropyran to yield the corresponding 17-tetrahydropyran-2-yl ether, which is allowed to react in tetrahydrofuran with lithium-liquid ammonia to produce 7α-methyl-5α - estrane - 3β,17β-diol 17-tetrahydropyran-2-yl ether. Reduction of the tetrahydropyran-2-yl ether with lithium tri(tertiary-butoxy) aluminum hydride, on the other hand, affords 7α-methylestr-4-ene-3β,17β-diol 17-tetrahydropyran-2-yl ether.

Acylation of the instant 3-hydroxy compounds with p-toluenesulfonyl chloride, preferably in the presence of a suitable acid acceptor, affords the corresponding 3-p-toluenesulfonates. 7α,17α - dimethyl-5α-androstane-3β,17β-diol is thus contacted with p-toluenesulfonyl chloride in pyridine to yield 7α,17α - dimethyl-5α-androstane-3β,17β-diol 3-p-toluenesulfonate.

The lower alkanoyl esters of this invention can be obtained either by acylation of the instant hydroxy compounds or by reduction of the appropriate 17-(lower alkanoyl)oxy starting materials. The former process is specifically illustrated by the reaction of 7α-methylandrost-4-ene-3β,17β-diol with acetic anhydride and pyridine to afford 7α-methylandrost-4-ene-3β,17β-diol 3,17-diacetate and the latter process by the reduction, with lithium tri-(tertiary-butoxy) aluminum hydride in tetrahydrofuran, of 17β-acetoxy-7α-methylandrost-4-en-3-one to yield 7α-methylandrost-4-ene-3β,17β-diol 17-acetate.

The invention will appear more fully from the examples which follow. These examples are set forth by way of illustration only and it will be understood that the invention is not to be construed as limited either in spirit or in scope by the details contained therein as many modifications both in methods and materials will be apparent from this disclosure to those skilled in the art. In these examples, temperatures are given in degrees centigrade (° C.) and quantities of materials in parts by weight unless otherwise noted.

EXAMPLE 1

To a solution of one part of 17β-hydroxy-7α-methylestr-4-en-3-one in 22.5 parts of tetrahydrofuran is added, at 0–5°, 3 parts of lithium tri-(tertiary-butoxy) aluminum hydride, and the resulting reaction mixture is stirred for about 2 hours, then is poured into a mixture of ice and water containing excess acetic acid. That acidic mixture is extracted with ether, and the ether layer is separated, washed successively with water and 5% aqueous sodium bicarbonate, then dried over anhydrous potassium carbonate and evaporated to dryness under reduced pressure. The resulting glass-like residue is purified by recrystallization from aqueous acetone to yield 7α-methylestr-4-ene-3β,17β-diol, melting at about 99–101° and exhibiting an optical rotation, in chloroform, of +9°. This compound is characterized further by the following structural formula

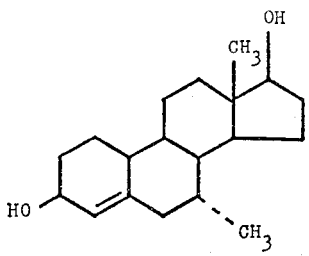

EXAMPLE 2

To a solution of 8 parts of 17β-hydroxy-7α,17α-dimethylestr-4-en-3-one in 315 parts of tetrahydrofuran is added 25 parts of lithium tri-(tertiary-butoxy) aluminum hydride at 0–5°, and the resulting mixture is stirred for about 1½ hours, then is poured into an ice-water mixture containing excess acetic acid. Extraction of that acidic mixture with ether followed by washing of the organic layer successively with water and dilute aqueous sodium bicarbonate affords an organic solution, which is dried over anhydrous sodium sulfate containing decolorizing carbon, then stripped of solvent by distillation under reduced pressure to afford, as an oil, 7α,17α-dimethylestr-4-ene-3β,17β-diol. This compound exhibits an optical rotation of +5° and is represented by the following structural formula

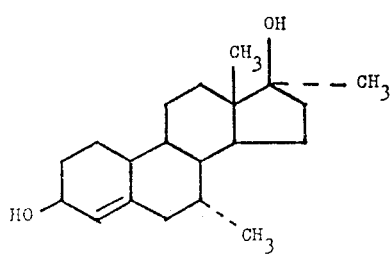

EXAMPLE 3

When an equivalent quantity of 17α-ethyl-17β-hydroxy-7α-methylestr-4-en-3-one is substituted in the procedure of Example 2, there is produced 17α-ethyl-7α-methylestr-4-ene-3β,17β-diol.

EXAMPLE 4

A solution of one part of 17β-hydroxy-7α,17α-dimethylandrost-4-en-3-one in 67.5 parts of tetrahydrofuran is cooled to 0–5° by means of an ice bath, at which time 3 parts of lithium tri-(tertiary-butoxy) aluminum hydride is added. That mixture is stirred for about 1½ hours, then is quenched by pouring into an ice-water mixture containing excess acetic acid. The precipitate which forms is collected by filtration, washed with water, dried in air, then purified by recrystallization from aqueous methanol to yield 7α,17α-dimethylandrost-4-ene-3β,17β-diol, which melts at about 161–163° and exhibits an optical rotation, in chloroform, of +14°. It is represented by the following structural formula

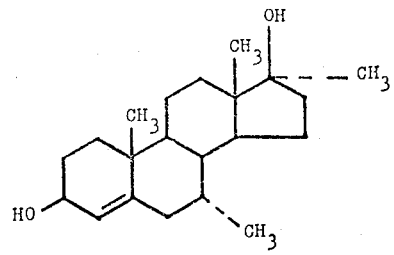

EXAMPLE 5

When an equivalent quantity of 17α-ethyl-17β-hydroxy-7α-methylandrost-4-en-3-one is substituted in the procedure of Example 4, there is produced 17α-ethyl-7α-methylandrost-4-ene-3β,17β-diol.

EXAMPLE 6

A solution of 20 parts of lithium tri-(tertiary-butoxy) aluminum hydride in 90 parts of tetrahydrofuran is added to a solution of 5 parts of 17β-hydroxy-7α-methylandrost-4-en-3-one in 90 parts of tetrahydrofuran, during which time the temperature of the reaction mixture is maintained at 0–5° by means of an ice bath. Stirring is continued for about 2¼ hours, after which time the mixture is poured into ice and water containing excess acetic acid. Extraction of that mixture with ether affords an organic solution, which is washed successively with water and 5% aqueous sodium bicarbonate, then dried over anhydrous sodium sulfate containing decolorizing carbon. Removal of the solvent by distillation under reduced pressure affords a foamy glass-like residue, which is recrystallized from aqueous methanol to yield pure 7α-methylandrost-4-ene-3β,17β-diol, melting at about 149–152°. This compound exhibits an optical rotation, in chloroform, of +38.5° and is further characterized by the following structural formula

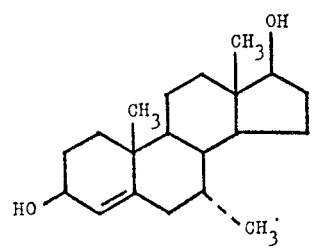

EXAMPLE 7

To a solution of 1.6 parts of 7α-methylandrost-4-ene-3β,17β-diol in 40 parts of ethanol is added 0.1 part of platinum oxide catalyst, and that hydrogenation mixture is stirred with hydrogen at atmospheric pressure and room temperature until one molecular equivalent of hydrogen is absorbed. Removal of the catalyst by filtration followed by distillation of the resulting filtrate to dryness affords the crude product as a foam-like residue. That material is purified by chromatography on a silica gel column followed by elution with 15% ethyl acetate in benzene and recrystallization of the eluted fraction from acetone, thus affording pure 7α-methyl-5α-androstane-3β,17β-diol.

This compound melts at about 139–142°, exhibits an optical rotation, in chloroform, of −6° and is represented by the following structural formula

EXAMPLE 8

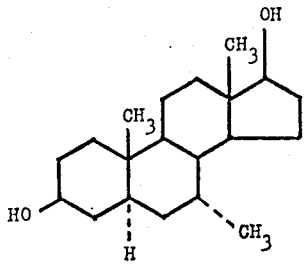

To a mixture containing 280 parts of liquid ammonia, 135 parts of tetrahydrofuran and 20 parts of isopropyl alcohol is added, with stirring, a solution of 11 parts of 17β-hydroxy-7α,17α-dimethylandrost-4-en-3-one in 45 parts of tetrahydrofuran. Lithium metal is then added portionwise until the blue color is maintained. A quantity of metal amounting to 4 parts is required. At that time an additional 8 parts of isopropyl alcohol is added, and the solution is stirred until the blue color is dissipated, approximately one hour being required. The ammonia is allowed to evaporate, and the residual mixture is carefully poured into ice and water. The precipitate which forms is collected by filtration, washed with water and dried in air to afford a solid residue containing 17β-hydroxy-7α,17α-dimethyl-5α-androstan-3-one. That residue is dissolved in 135 parts of tetrahydrofuran, and a solution of 9 parts of lithium aluminum hydride in 135 parts of tetrahydrofuran is added. Stirring is continued at room temperature for about 3 hours, following which time a solution of 9 parts of water in 22.5 parts of tetrahydrofuran, 7 parts by volume of 20% aqueous sodium hydroxide and 30 parts of water are successively added. The resulting precipitated inorganic salts are collected by filtration and washed on the filter with tetrahydrofuran. The filtrate and washings are combined and concentrated to dryness under reduced pressure to afford the solid crude product. Recrystallization of that material from aqueous methanol affords pure 7α,17α-dimethyl-5α-androstane-3β,17β-diol, melting at about 211–212.5°. This compound is represented by the following structural formula

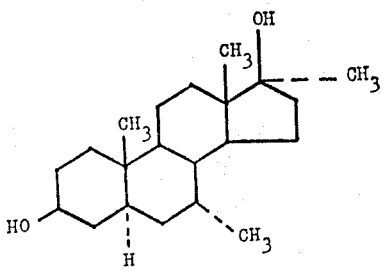

EXAMPLE 9

When an equivalent quantity of 17β-hydroxy-7α-meth-7α-methylandrost-4-en-3-one is substituted in the procedure of Example 8, there is obtained 17α-ethyl-7α-methyl-5α-androstane-3β,17β-diol.

EXAMPLE 10

When an equivalent quantity of 17β-hydroxy-7α-methylestr-4-en-3-one is substituted in the procedure of Example 8, there is obtained 7α-methyl-5α-estrane-3β,17β-diol.

EXAMPLE 11

By substituting an equivalent quantity of 17β-hydroxy-7α,17α-dimethylestr-4-en-3-one and otherwise proceeding according to the processes described in Example 8, there is produced 7α,17α-dimethyl-5α-estrane-3β,17β-diol.

EXAMPLE 12

When an equivalent quantity of 17α-ethyl-17β-hydroxy-7α-methylestr-4-en-3-one is subjected to the processes of Example 8, there is obtained 17α-ethyl-7α-methyl-5α-estrane-3β,17β-diol.

EXAMPLE 13

A mixture containing one part of 7α-methylandrost-4-ene-3β,17β-diol, 10 parts of acetic anhydride and 20 parts of pyridine is allowed to stand at room temperature for about 16 hours, then is carefully poured into a large quantity of water. Extraction of that aqueous mixture with benzene affords an organic solution, which is dried over anhydrous sodium sulfate, then concentrated to dryness under reduced pressure to afford 7α-methylandrost-4-ene-3β,17β-diol 3,17-diacetate.

EXAMPLE 14

A mixture of 5 parts of 7α-methyl-5α-estrane-3β,17β-diol, 65 parts of propionic anhydride and 100 parts of pyridine is stored at room temperature for about 16 hours, then is carefully diluted with water. Extraction of the resulting aqueous mixture with benzene affords an organic solution, which is dried over anhydrous sodium sulfate, then stripped of solvent by distillation under reduced pressure to afford 7α-methyl-5α-estrane-3β,17β-diol 3,17-dipropionate.

EXAMPLE 15

The substitution of an equivalent quantity of 17β-acetoxy-7α-methylandrost-4-en-3-one in the procedure of Example 1 results in 7α-methylandrost-4-ene-3β,17β-diol 17-acetate.

EXAMPLE 16

When an equivalent quantity of 7α,17α-dimethyl-5α-estrane-3β,17β-diol is substituted in the procedure of Example 13, there is produced 7α,17α-dimethyl-5α-estrane-3β,17β-diol 3-acetate.

EXAMPLE 17

To a solution of 9 parts of 17β-hydroxy-7α-methylester-4-en-3-one in 100 parts of methylene chloride is added 10 parts of dihydropyran and 0.02 part of p-toluenesulfonic acid monohydrate. The resulting reaction mixture is stored at room temperature for about 48 hours, following which time a small quantity of pyridine is added, and the solvent is removed by distillation under reduced pressure. The resulting oily residue, amounting to 11 parts and containing 17β-hydroxy-7α-methylestr-4-en-3-one 17-tetrahydropyran-2-yl ether, is dissolved in 157 parts of tetrahydrofuran. That solution is added to a mixture containing 315 parts of liquid ammonia and 90 parts of tetrahydrofuran, following which time 2 parts of lithium metal is added in small portions with stirring over a period of about 15 minutes. 24 parts of isopropyl alcohol is then added. The solution becomes colorless after stirring for about 10 minutes. An additional one part of lithium metal followed by 24 parts of isopropyl alcohol are then added, and the solution is stirred for approximately 30 minutes. The excess reagent is destroyed by the addition of methanol, and the ammonia is allowed to evaporate at room temperature. The residual mixture is poured into water, then is extracted with ether. The organic solution is separated, washed with water, dried over anhydrous sodium sulfate containing decolorizing carbon, then stripped of solvent by distillation under reduced pressure. Chromatography of the residual oil on silica followed by elution with 5% ethyl acetate in benzene affords 7α-methyl-5α-estrane-3β,17β-diol 17-tetrahydropyran-2-yl ether as an oil. Infrared absorption maxima are observed, in chloroform, at about 2.75, 3.4, 8.79 and 9.68 microns.

EXAMPLE 18

To a solution of 5.5 parts of 7α-methyl-5α-estrane-3β,17β-diol 17-tetrahydropyran-2-yl ether in 50 parts of pyridine is added 5.5 parts of p-toluene-sulfonyl chloride and the resulting mixture is stored at room temperature for about 2½ hours, then is poured carefully into water. The resulting precipitate is collected by filtration, washed on the filter with water, then purified by recrystallization first from aqueous acetone then from acetone to produce 7α-methyl-5α-estrane-3β,17β-diol 3 - p - toluenesulfonate, 17-tetrahydropyran-2-yl ether, melting at about 151–153° with decomposition. This compound displays an optical rotation, in chloroform, of −15° and is represented by the following structural formula

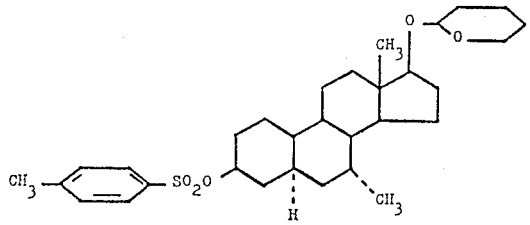

EXAMPLE 19

To a solution of 8.3 parts of 7α,17α - dimethyl - 5α-androstane-3β,17β-diol in 60 parts of pyridine is added 8.3 parts of p-toluenesulfonyl chloride, during which time the temperature of the mixture is kept at about 25° by means of external cooling. The reaction mixture is then kept at room temperature for about 16 hours, following which reaction time it is poured into a mixture of ice and water. The precipitate which forms is collected by filtration, washed with water and dried in air to yield 7α,17α-dimethyl-5α-androstane-3β,17β-diol 3-p - toluenesulfonate. This compound is characterized by infrared absorption peaks, in chloroform, at about 2.75, 3.40, 6.24 and 8.50 microns.

What is claimed is:

1. 7α-methyl-5α-estrane-3β,17β-diol 3 - p - toluenesulfonate, 17-tetrahydropyran-2-yl ether.
2. 7α-methyl-5α-estrane-3β,17β - diol 17 - tetrahydropyran-2-yl-ether.

References Cited
UNITED STATES PATENTS

| | | | |
|---|---|---|---|
| 3,262,949 | 7/1966 | Ringold et al. | 260—397.3 |
| 3,301,879 | 1/1967 | Wettstein et al. | 260—397.5 |
| 3,341,411 | 9/1967 | Campbell et al. | 167—65 |

LEWIS GOTTS, *Primary Examiner.*

E. G. LOVE, *Assistant Examiner.*